United States Patent [19]

Ifuku et al.

[11] 4,294,861
[45] Oct. 13, 1981

[54] METHOD OF SEPARATING AND TAKING OUT PULP FROM CITRUS FRUITS

[75] Inventors: Yasushi Ifuku; Hirofumi Uchiyama, both of Wakayama; Masayuki Hayashi, Komaki, all of Japan

[73] Assignees: Mitsubishi Jukogyo Kabushiki Kaisha, Tokyo; Prefectural Economic Federation of Agricultural Co-operatives, Wakayama, both of Japan

[21] Appl. No.: 163,554

[22] Filed: Jun. 27, 1980

Related U.S. Application Data

[63] Continuation of Ser. No. 17,853, Mar. 6, 1979.

[51] Int. Cl.³ .............................................. A23L 2/26
[52] U.S. Cl. ...................................... 426/475; 99/516; 99/584; 426/481; 426/489
[58] Field of Search ............... 426/481, 599, 489, 590, 426/475, 506; 99/584, 536, 516

[56] References Cited

U.S. PATENT DOCUMENTS 1,982,741  12/1934  Keenan ............................... 426/489

*Primary Examiner*—S. Leon Bashore
*Assistant Examiner*—Michael Goldman
*Attorney, Agent, or Firm*—Wyatt, Gerber, Shoup, Scobey & Badie

[57] ABSTRACT

A method and an apparatus for processing citrus fruits into a drink, which is the juice of the fruits containing separate juice vesicles, or sacs, of the pulp, by cutting the fruits into pieces and directing jets of a fluid against the cut surfaces, thereby separating and forcing the pulp in the form of separate sacs away from the peel and segmental membrane of the fruit pieces.

7 Claims, 11 Drawing Figures

METHOD OF SEPARATING AND TAKING OUT PULP FROM CITRUS FRUITS

This is a continuation, of application Ser. No. 017,853 filed Mar. 6, 1979.

BACKGROUND OF THE INVENTION

This invention relates to a method of separating and taking out only the pulp from citrus fruits and also to an apparatus for practicing the same.

A conventional sequence of operations for pulp separation from citrus fruits, for example, from tangerines, is as follows.

Tangerines consist, as illustrated in FIG. 1, of an epicarp or peel a, an endocarp or segmental membrane b, and pulp d. The segmental membrane b and the pulp d combine to form segments c. The separation of the pulp d is accomplished by a series of operations as represented by a flow sheet in FIG. 2.

First, the tangerines ready for processing are led to a steaming step, in which they are passed through steam or hot water at about 90° C. for two to three minutes to loosen the peel a from the underlying layer of the segmental membrane b, making the peel easier to separate. In a peeling step that follows, the fruits are moved through a peeler, where they are stripped of the peel a by a pair of pawled rolls. The peeled tangerines are divided, in a segmental step, into segments c, which usually number from 10 to 12 apiece. In a membrane-removal step the segments c are naked by a chemical treatment. The segmental membrane b is usually dissolved in an acid solution, followed by neutralization with an alkaline solution. The arrangements for this purpose comprise troughs in which the acid and alkaline solutions flows by gravity, so that the segments c flow concurrently with the solutions, in succession, for dissolution and removal of the segmental membrane b. Then, in a rinsing step, the pulp in the form of fully skinned segments c (hereinafter called "segmental pulp") is washed with water to remove the remnants of the chemicals. Like the arrangements used for the removal of the segmental membrane b, the device to be employed here is a trough, in which the segmental pulp flows together with water and are completely freed of the chemicals. In this way the segmental membrane b is removed and the pulp d consisting of the naked segments only, that is, segmental pulp, results. Ordinary canned tangerines are made by canning the pulp segments so obtained.

On the other hand, the pulp-sac-containing fruit drink of tangerines, so called because it is a mixture of tangerine juice with the juice vesicles, or sacs, of tangerine pulp, is usually prepared in the way now to be explained. The segmental pulp obtained in the manner above described is purchased from a tangerine canner and is subjected to a pulp-separating operation, in which the pulp segments are mixed with syrup and separated into the component juice vesicles or sacs. The sacs of pulp and syrup are blended with water and other additives to prepare the so-called pulp-sac-containing fruit drink.

As described above, the pulp of fruits, such as tangerines, for use in the pulp-sac-containing fruit drinks has heretofore been obtained by the ordinary method of producing the tangerine pulp for canning that involves a number of treatment steps. The arrangements used for those treatments, for example, the devices for removing the segmental membrane and rinsing the skinned fruits are made up of troughs hundreds of meters long for the flow of an acid or alkaline solution or water. Consequently, a large-scale plant and additional facilities for disposal of wastewater resulting from the use of acid and alkaline solutions are necessary. It is for this reason that juice manufacturers buy segmental pulp as their starting material from tangerine canners as above noted, and naturally the cost is high. In addition, the removal of the peel a in the afore-mentioned peeling step and the removal of the segmental membrane b in the membrane-removal step are not completely done mechanically, and it is common practice to complete it with human assistance. Among other problems of the conventional method is the deterioration in quality and taste of the tangerines due to the heat treatment by steaming.

SUMMARY OF THE INVENTION

The present invention has for its object the provision of a method and an apparatus for separating the pulp of citrus fruits, such as tangerines, without any special pretreatment of the fruits and without the use of chemicals but with extreme ease. The method of the invention is characterized by injecting a fluid from injection nozzles installed along fruit passages against the cut surfaces of the fruits divided into pieces and fed with the pulp exposed, thereby forcing the fluid into the segments of the pulp and separating and taking out the pulp in the form of separate sacs from the peel and segmental membrane of the fruits. The jets of the fluid directed against the cut surfaces, squeeze into the pulp and reach the converging ends of the pulp segments, and are shifted in direction by the segmental membrane. Repetition of this action disconnects the juice vesicles or sacs of the pulp from the membrane, separating the sacs of the pulp from each other and from the membrane. In this manner the pulp is obtained in the form of separate, unimpaired sacs. The invention thus makes it possible to separate the pulp and take it out in the sac form from unprocessed tangerines in an extremely simple and easy way without subjecting the fruits to any heat treatment, peeling, removal of the segmental membrane or other special treatments or using chemicals. In accordance with the invention an apparatus is also provided which is characterized by a pair of endless belts so installed as to form sections where they move facing each other and preceding sections where they part horizontally from each other in opposite directions, a number of citrus-fruit holders mounted in rows on both endless belts so as to face each other, a citrus-fruit cutter located at the point where the two endless belts move apart horizontally, nets stretched from the cutter position to the directions in which the two endless belts part horizontally so as to support the cut surfaces of the pieces of citrus fruits cut by the cutter, and fluid injection nozzles installed on the opposite side of the nets to give jets of a fluid to the cut surfaces of the fruit pieces being conveyed as supported by the holders and nets.

In the apparatus of the construction above defined, tangerines as raw materials are fed at the entrance of a passage where a pair of endless belts meet and run together, to be held between the holders mounted opposite to each other on the sections of the endless belts moving together, and are cut into halves by the cutter at the point where the belts part horizontally from each other. As the halves are conveyed with the cut surfaces in sliding contact with the nets, jets of a fluid from injection nozzles are directed against the surfaces to separate and take out the pulp in the form of separate sacs. The invention thus provides a pulp-sac separating apparatus for citrus fruits, which is very compact in construction and low at cost. The large-scale equipment of the prior art is no longer required and, with the installation of the present apparatus, fresh tangerines can be directly handled to separate and take out the pulp, thus providing a supply of inexpensive fruit pulp.

The apparatus according to the invention may also be employed advantageously as a unit for the pretreatment of citrus fruits from which the juice is to be extracted on a fruit press.

The above and other objects, features, and advantages of the present invention will become more apparent from the following description taken in conjunction with the accompanying drawings.

DETAILED DESCRIPTION

Figure 3:
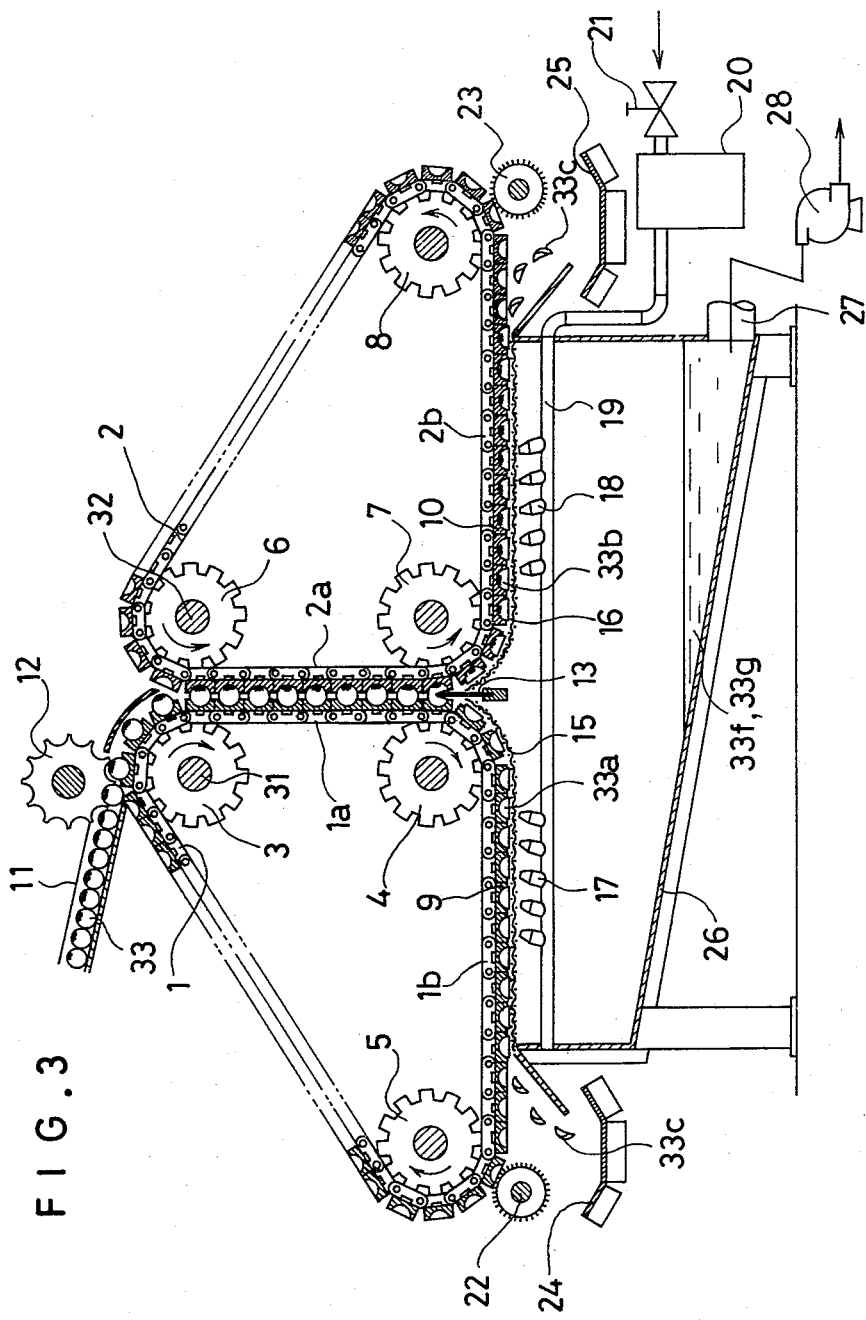
FIG. 3 is a schematic front view of an apparatus embodying the invention, partly sectioned to show the general construction.
Figure 4:
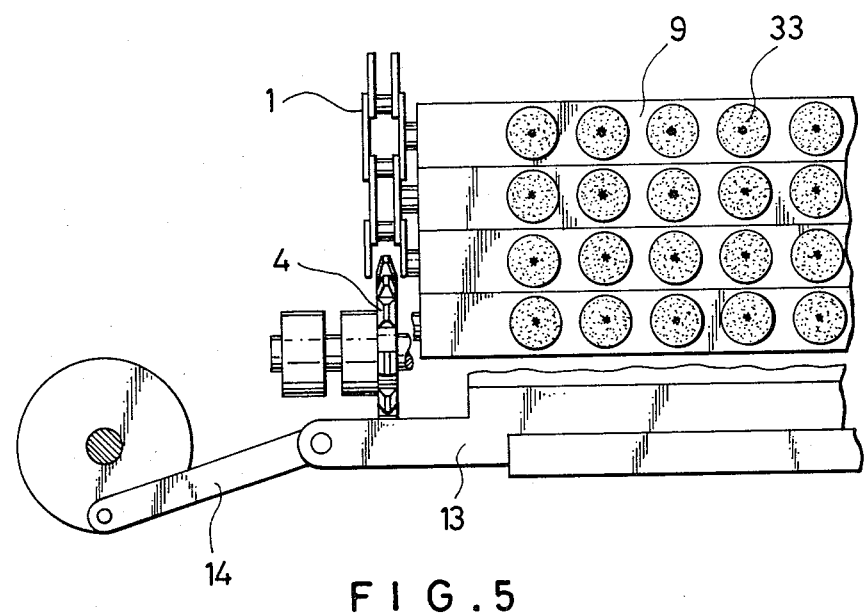
FIG. 4 is a partial side view of a cutter and drives.
Figure 5:
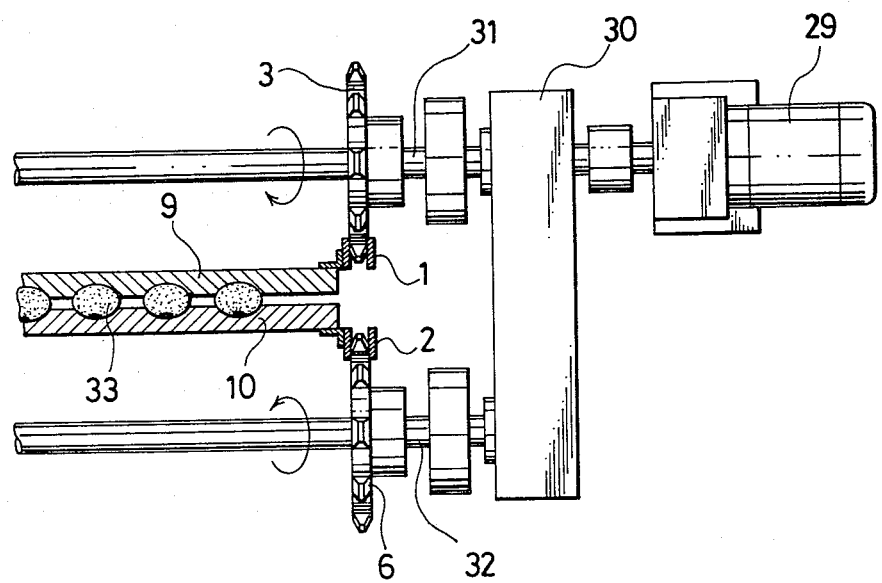
FIG. 5 is a partial plan view of drives for endless chains.

Referring now to FIG. 3, there are shown two endless chains 1, 2 in the form of right-angled triangles arranged side to side, so as to meet and run together downwardly in vertical sections 1a, 2a and continuously move apart horizontally in sections 1b, 2b, with two sets of sprockets 3, 4, 5 and 6, 7, 8 disposed at the corners, respectively. This pair of endless chains and another pair not shown are installed in tandem to run parallel. Two rows of tangerine-holding slats 9, 10 are supported at both ends by the two pairs of chains 1, 2. Each of the slats is formed with a plurality of semispherical recesses on the outer surface. A chute 11 for aligning and feeding the tangerines to be processed is located close to the entrance of the path where the vertical section 1a of the running chain 1 meets the opposite section of the other chain. The chute 11 has a plurality of grooves corresponding in number to the semispherical recesses of each tangerine-holding slat. As better shown in FIG. 8, the chute 11 is designed so that the width of each groove in the middle part is substantially equal to the height of the tangerines and is thence gradually changed to be substantially equal to the width of the fruits leaving at the end, thus controlling the position of the fruits during the movement for feeding. The chute may be equipped with some vibrator means to ensure smooth, uninterrupted feeding of tangerines. A feed wheel 12, mounted above the outlet of the aligning-feeding chute 11, is adapted to rotate synchronously with the travel of the endless chains in order to transfer the tangerines in succession from the chute to the holding slats. At the point where the endless chains 1, 2 moving downward in engagement part from each other in opposite directions horizontally, a cutter 13 is held with its edge upward to be driven back and forth reciprocatingly by a crank mechanism 14, so that the tangerines conveyed by the holding slats 9, 10 are cut in halves. Nets 15, 16 are stretched under the endless chains 1, 2, from the region where the cutter 13 is located to the horizontal sections of the chains to support the halves of the tangerines being conveyed away from the cutter 13, with the cut surfaces downward. They are of meshes appropriate for preventing the fall of the halves from the holding slats 9, 10 but large enough to allow the sacs of the pulp to drop through them away from the rest of the fruits. A plurality of fluid injection nozzles 17, 18 are located beneath the nets 15, 16, on the sides opposite to the chains 1, 2. These nozzles are oriented to give jets of air to the cut surfaces of the halves while the latter are being conveyed horizontally by the holding slats 9, 10, in sliding contact with the nets 15, 16. The nozzles are supplied with compressed air from a suitable source not shown through a pipe 19 on which they are mounted, an air controller 20 for cleaning the air to a clean, oil-free state and metering the air supply while maintaining a predetermined pressure, and a valve 21 on the far side of the controller. Residue removers 22, 23, consisting of rollers covered with a brush each, are located near the terminations of the nets 15, 16, in rolling contact with the moving slats 9, 10. Beneath the residue removers 22 and 23 are installed conveyors 24 and 25, respectively, for delivering the pulpless fruit residues for disposal. A container 26 for receiving the separated pulp sacs and juice of the fruit is placed under the horizontal sections 1b, 2b of the endless chains 1, 2. To the bottom part of the container 26 is connected a pipe 27 for recovery of the pulp and juice, with a pump 28 installed midway. In FIG. 5 are shown a motor 29 for driving the endless chains 1, 2, and a gear box 30 disposed between the motor and drive shafts 31, 32 on which the drive sprockets 3, 6 are fixedly mounted.

Throughout the figures the numeral 33 indicates tangerines to be processed, and 33a, 33b indicate the fruit cut in halves. The numeral 33c designate the peel, 33d the segmental membrane, 33e the segment, 33f the pulp or pulp sac, and 33g the juice of the fruit.

Figure 8:
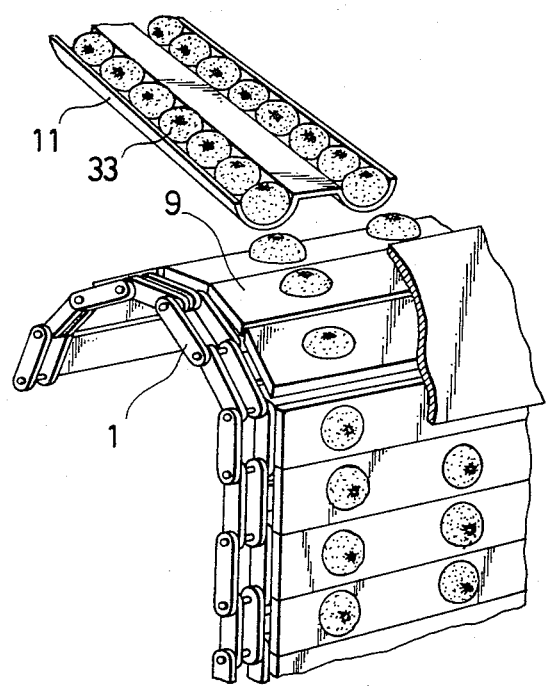
FIG. 8 is a perspective view of tangerine feeder means.

The embodiment of the construction above described operates in the following way. Tangerines 33, sorted into size and quality classifications and washed, are fed by the chute 11, as shown in FIG. 8, with their positions shifted gradually according to the width of the chute grooves until their initially horizontal cores stand upright at the end of the chute. The tangerines are then allowed to sit successively in the recesses of the holding slats 9 with the aid of the feed wheel 12, and held in the spaces formed by the pairs of opposed recesses of the slats 9, 10 in the vertical sections 1a, 2a of the endless chains 1, 2, and then are conveyed downward with the travel of the chains. At the lower end of the downward path where the chains move apart horizontally the tangerines are cut across in halves by the cutter 13. The semispherical halves 33a, 33b of the fruit, still resting in the recesses of the holding slats 9, 10, are supported at the cut surfaces by the nets 15, 16 and, in sliding contact with the nets, they are conveyed in opposite directions horizontally. During this run, they are subjected to jets of air from the fluid injection nozzles 17, 18. The jets, which consist of clean air adjusted in pressure and volume by the air controller 20, do not affect the quality of the fruit unfavorably.

Figure 1:
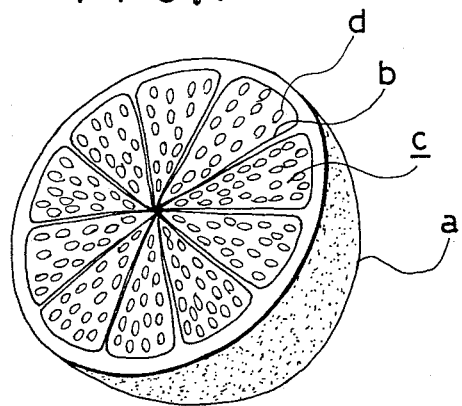
FIG. 1 is a perspective view of a half of tangerine cut in two.
Figure 2:
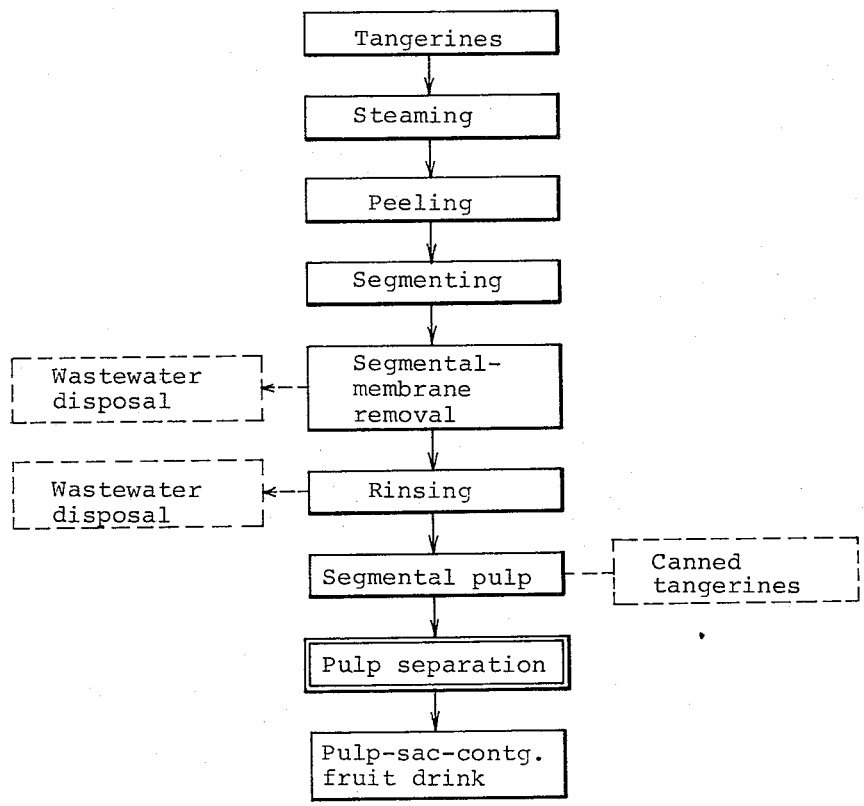
FIG. 2 is a flow sheet of a conventional process for fruit pulp separation.
Figure 10:
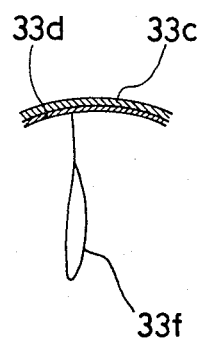
FIG. 10 is an enlarged sectional view showing the peel, the segmental membrane, and one of the pulp sacs of a tangerine clinging to each other.
Figure 9:
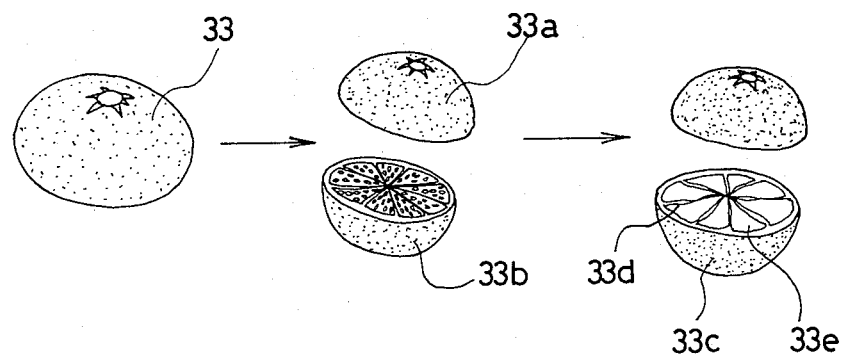
FIG. 9 is a perspective view of a tangerine, showing the sequence of cutting in two and separating and taking out the pulp from the halves.

The air jets are directed against the cut surfaces to squeeze into the pulp 33f and reach the converging ends of the pulp segments, and are shifted in direction by the endocarp or membrane 33d of the segment halves. Repetition of this action disconnects the juice vesicles or sacs of the pulp 33f from the membrane 33d as shown in FIG. 10, separating the sacs of the pulp 33f from each other and from the membrane. The released sacs, as in FIG. 6, fall together with the juice 33g through the meshes of the nets 15, 16. They are collected in the container 26 and are transferred by the pump 28, through the recovery line 27, to the next station, where the mixture will be processed into a fruit drink containing pulp sacs or will be all converted to juice by a fruit press. The sequence of operations is as represented by a flow sheet in FIG. 11. As will be clear from the chart, fruits such as tangerines are simply cut into pieces and the pulp is separated by jets of air directed against the cut surfaces in accordance with the invention, so that the fruit pulp in the form of sacs and juice can be obtained easily and positively with no danger of deterioration in quality, without the need of any special pretreatments (e.g., heating, peeling, membrane removal, and water washing) or of chemicals as required in the conventional process illustrated in FIG. 2.

Figure 11:
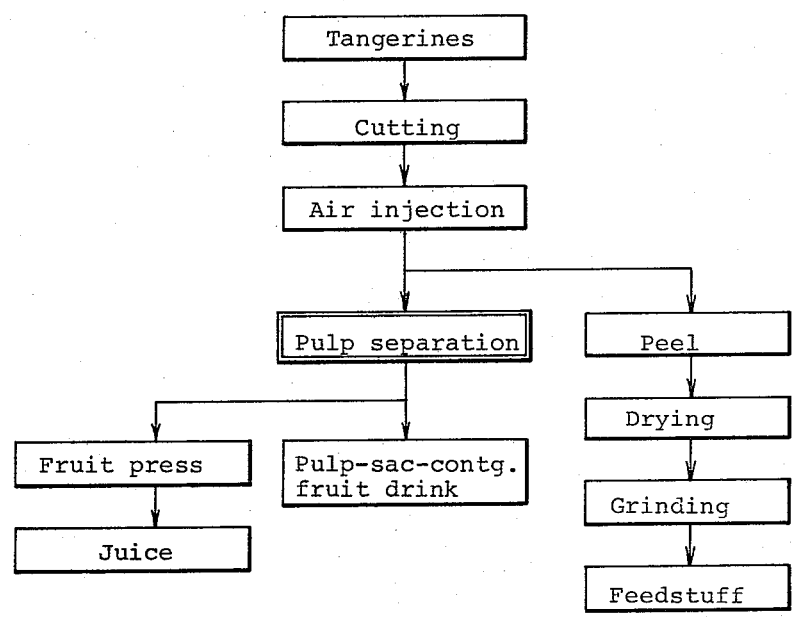
FIG. 11 is a flow sheet of the process for fruit pulp separation according to the invention.

Deprived of the pulp, the empty fruit pieces consisting of the peel 33e and segmental membrane 33d are carried farther until they fall away from the holding slats 9, 10 at the terminations of the nets 15, 16, and the residues still clinging to the slats are brushed off by the removers 22, 23, all onto the delivery conveyers 24, 25 installed below. Then, as indicated in FIG. 11, they may be sent to a feed plant or the like for drying and grinding to feedstuff. The invention thus calls for no such large-scale processing installations or equipment for wastewater disposal that are needed commonly; it permits a very compact and low-cost apparatus to separate the pulp directly from the material fruits, such as tangerines.

Figure 6:
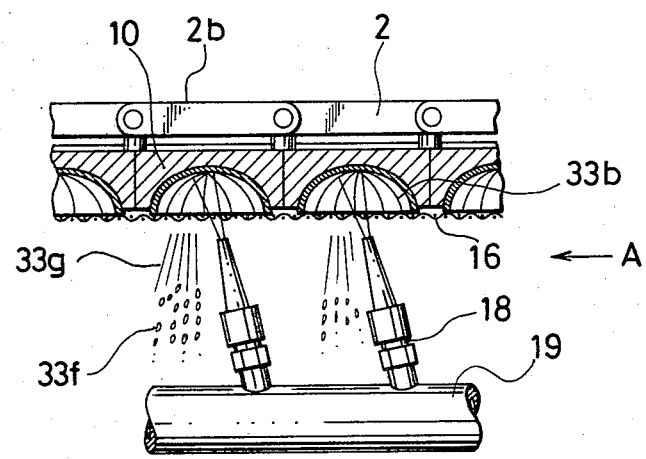
FIG. 6 is a partial enlarged view of fluid injection nozzles separating and forcing out pulp sacs from fruit halves.
Figure 7:
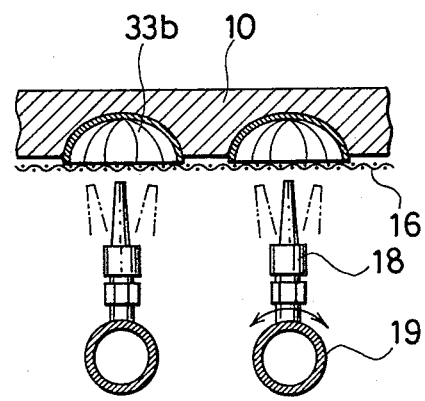
FIG. 7 is a view looking in the direction of the arrow of FIG. 6.

The plurality of fluid injection nozzles 17 or 18 in each bank, as shown in FIGS. 6 and 7, are directed at different predetermined angles to the conveying direction of the tangerines in order that they may give the jets of air evenly to the cut surfaces of the fruits. It is also possible to design the fluid injection nozzles 17, 18 so that they can rock in the directions of arrows in FIG. 7 or are replaceable with other suitable ones depending upon the kind and size of the citrus fruits to be handled next. The halving cutter 13 of the embodiment above described is not limited to the reciprocating type; it may be of a rotary type as well.

Although the embodiment uses air under pressure as the medium of jet streams, other gases, such as $N_2$ and $CO_2$, may be equally employed. Aside from such gases, liquids, for example, water, may also be used. Even part of the fruit juice obtained may be fed back for this purpose.

Further, while each tangerine in the above embodiment is halved, it may be cut into more pieces. In the same embodiment the tangerines are supported in such a manner that their cut ends with exposed pulp face downward to receive the jets of air from below. This is not a limitation to the invention; an alternative arrangement is possible, in which the tangerines cut into pieces by hand or mechanically and being conveyed are moved by suitable means through a tunnel-like passage of netting, where they are subjected to jets of air from the nozzles radially installed, stationarily or intermittently rotatably, around the passage and directed toward the tangerine pieces. In this case the separation of the pulp from the divided pieces of tangerines moving through the tunnel can be satisfactorily accomplished regardless of whether the cut ends of the fruits with exposed pulp are facing upward, obliquely upward or otherwise.

What is claimed is:

1. A method of continuously processing citrus fruits to separate the pulp and juice from said fruit which comprises the steps of:
   1. dividing the fruit into pieces;
   2. Supporting said fruit pieces between an endless chain and a perforated net wherein said net is between said fruit pieces and a plurality of fluid injection nozzles which are directed toward the fruit's exposed pulp;
   3. Continuously moving the fruit pieces in a linear path along the net with the endless chain; and
   4. injecting fluid from said fluid injection nozzles into said fruit pieces while, said fruit pieces are moving along the net, to separate said pulp and juice from said fruit, said pulp and juice passing through said net.

2. A process as in claim 1 wherein the fluid is compressed air.

3. A process as in claim 1 wherein the fluid is nitrogen.

4. A process as in claim 1 wherein the fluid is carbon dioxide.

5. A process as in claim 1 wherein the fluid is water.

6. A process as in claim 1 wherein the fluid is juice from the processed citrus fruit.

7. A method according to claim 1 in which said citurs fruits are cut across the cores into halves.

* * * * *

UNITED STATES PATENT AND TRADEMARK OFFICE
CERTIFICATE OF CORRECTION

PATENT NO. : 4,294,861
DATED : October 13, 1981
INVENTOR(S) : YASUSHI IFUKU ET AL It is certified that error appears in the above-identified patent and that said Letters Patent are hereby corrected as shown below:

On the title page, Item [73], change "Co-Operative, Wakayama, both of"

to read ----Co-Operatives, Wakayama Pref., Wakayama, both of----.

Signed and Sealed this

Eighteenth Day of May 1982

[SEAL]

Attest:

GERALD J. MOSSINGHOFF

Attesting Officer

Commissioner of Patents and Trademarks